(12) United States Patent
Buchanan

(10) Patent No.: US 10,352,375 B2
(45) Date of Patent: Jul. 16, 2019

(54) CLUTCH WITH INTEGRATED TEMPERATURE SENSOR

(71) Applicant: BorgWarner Inc., Auburn Hills, MI (US)

(72) Inventor: Mark R. Buchanan, Rochester Hills, MI (US)

(73) Assignee: BORGWARNER INC., Auburn Hills, MI (US)

( * ) Notice: Subject to any disclaimer, the term of this patent is extended or adjusted under 35 U.S.C. 154(b) by 135 days.

(21) Appl. No.: 15/516,477

(22) PCT Filed: Sep. 29, 2015

(86) PCT No.: PCT/US2015/052785
§ 371 (c)(1),
(2) Date: Apr. 3, 2017

(87) PCT Pub. No.: WO2016/057263
PCT Pub. Date: Apr. 14, 2016

(65) Prior Publication Data
US 2018/0231065 A1    Aug. 16, 2018

Related U.S. Application Data

(60) Provisional application No. 62/061,882, filed on Oct. 9, 2014.

(51) Int. Cl.
*F16D 13/64* (2006.01)
*F16D 13/72* (2006.01)
(Continued)

(52) U.S. Cl.
CPC ............ *F16D 13/72* (2013.01); *F16D 13/648* (2013.01); *F16D 66/00* (2013.01); *F16D 69/00* (2013.01);
(Continued)

(58) Field of Classification Search
CPC ........ F16D 13/72; F16D 13/648; F16D 66/00; F16D 69/00; F16D 2066/001; F16D 2300/18
See application file for complete search history.

(56) References Cited

U.S. PATENT DOCUMENTS 5,909,171 A    6/1999   Kyrtsos
6,006,869 A    12/1999  Rancourt et al.
(Continued)

FOREIGN PATENT DOCUMENTS

DE    4021736 A1 * 12/1991 ............. F16D 13/58
DE    69732355 T2 * 1/2006 ............. G01L 3/102
(Continued)

OTHER PUBLICATIONS

International Search Report for International Application No. PCT/US2015/052785, dated Jan. 7, 2016.

*Primary Examiner* — Jacob S. Scott
*Assistant Examiner* — Murad Jahmani
(74) *Attorney, Agent, or Firm* — Warn Partners, P.C.

(57) ABSTRACT

A temperature monitoring system and method of utilization thereof is provided that provides the freedom of direct temperature determination from a friction plate (often referred to as a disc) or clutch friction separator plate in a clutch friction pack. The temperature monitoring system includes a temperature sensor which is placed on the friction disc or friction separator plate. An induction coil is placed on the friction disc or friction separator plate which provides placement for the temperature sensor. A magnet is provided to provide a magnetic field for the induction coil in order to generate current to power the temperature sensor. An antenna may also be provided which allows the temperature electronic data to be transmitted to a remote receiver.

12 Claims, 2 Drawing Sheets

(51) Int. Cl.
    *F16D 66/00*     (2006.01)
    *F16D 69/00*     (2006.01)

(52) U.S. Cl.
    CPC .... *F16D 2066/001* (2013.01); *F16D 2300/18* (2013.01)

(56) References Cited

U.S. PATENT DOCUMENTS

2010/0017087 A1    1/2010   Degenstein
2012/0000277 A1    1/2012   Fischer

FOREIGN PATENT DOCUMENTS

| EP | 1056994 A1 * | 12/2000 | ............... G01K 7/08 |
|----|--------------|---------|---------------------------|
| JP | 2006094576 A | 4/2006  |                           |
| JP | 5314498 B2   | 10/2013 |                           |

* cited by examiner

CLUTCH WITH INTEGRATED TEMPERATURE SENSOR

CROSS REFERENCE TO RELATED APPLICATIONS

This application is a National Stage of International Application No. PCT/US2015/052785, filed Sep. 29, 2015. This application claims benefit of U.S. Provisional Patent Application No. 62/061,882 filed on Oct. 9, 2014. The disclosures of the above applications are incorporated herein by reference.

FIELD OF THE INVENTION

The present invention relates to temperature sensors for clutches. More particularly, the field of the present invention is that of temperature sensors for clutches useful in automotive applications for automatic transmissions, dual clutch transmissions, and transfer case clutches.

BACKGROUND OF THE INVENTION

One of the main factors affecting clutch operation, durability, and performance, is that of clutch temperature. Typically, to determine clutch temperature, the temperature of the lubricant which is utilized with the clutch is determined and a calculation is made. It would be desirable to know the clutch temperature directly from a sensor which is engaged with either a friction disc or friction plate of a clutch friction pack. Knowing the clutch temperature would be useful in predicting clutch shutter, clutch durability, or utilizing a more optimal cooling strategy. The more optimal cooling strategy can lower spin loss by lowering the lube flow for the clutch friction pack. Additionally, clutch slip may be utilized to warm up automatic transmission, dual clutch transmission, or transfer case for improved efficiency during initial start up of a vehicle.

SUMMARY OF THE INVENTION

To make manifest the above noted desires, a revelation of the present invention is brought forth. In a preferred embodiment, the present invention brings forth a temperature monitoring system which provides the freedom of direct temperature determination from a friction plate (often referred to as a disc) or clutch friction separator plate. In one of many preferred embodiments, the present invention brings forth a temperature monitoring system wherein a temperature sensor is placed on one of the frictions discs or fiction separator plates. An induction coil is placed on the friction disc or friction plate which also provides placement for the temperature sensor. A magnet is provided to provide a magnetic field for the induction coil in order to generate a current to power the temperature sensor. An antenna may also be provided which allows the temperature electronic data to be transmitted to a remote receiver.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
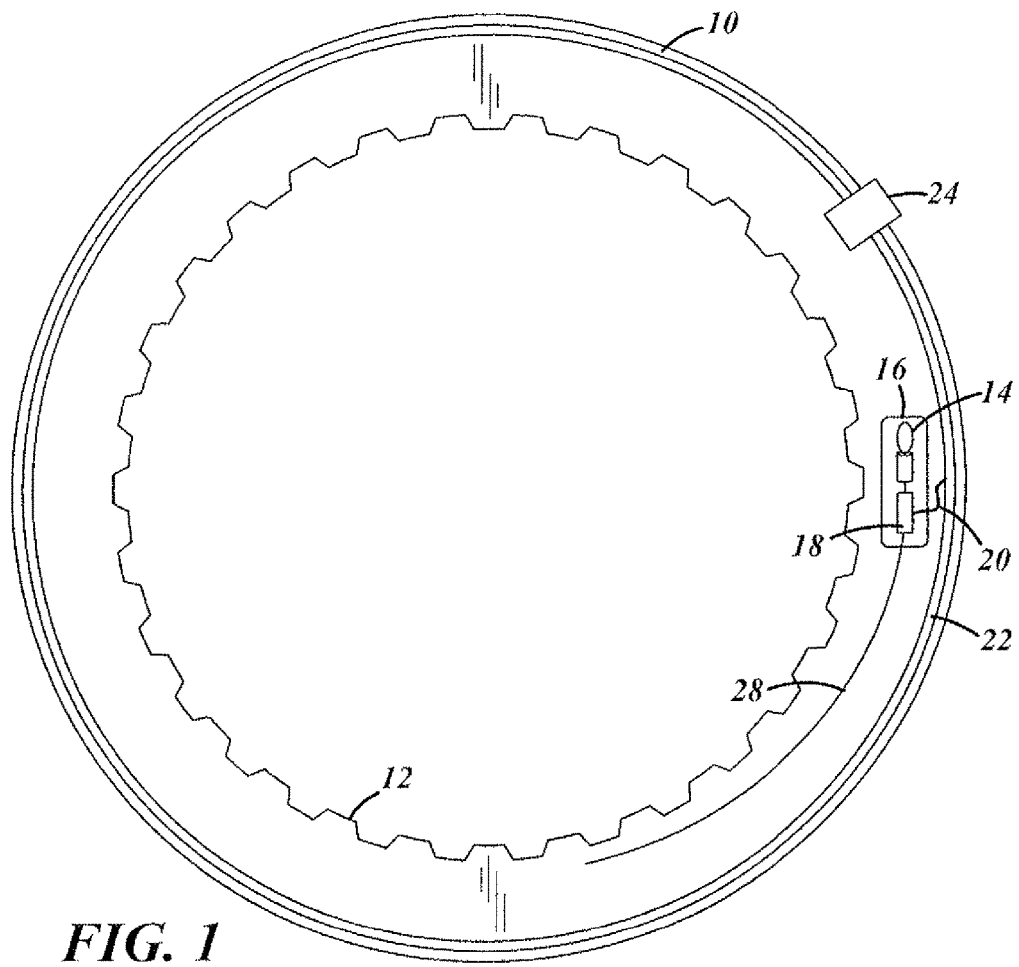
FIG. 1 is a front elevational view of a temperature monitoring system for a clutch apparatus according to the present invention wherein the temperature sensor is embedded in a friction separator plate.

FIG. 1 illustrates a friction separator or backing plate utilizing the temperature monitoring system for a clutch according to the present invention. The friction separator plate 10 is annular in shape having a series of inner diameter gear or spline teeth 12 for engagement with a shaft (not shown). Typically, the friction separator plate is fabricated from a metallic material such as low carbon steel. Embedded within the friction separator plate is a temperature sensor 14. The temperature sensor is typically positioned within a cutout 16 of the friction separator plate 10 so as not to be in direct physical contact with a friction disc which laterally engages the friction separator plate. Typically, the friction separator plate 10 is able to slide axially upon the shaft that it is torsionally engaged with. The sensor 14 is typically a resistance temperature detector or a thermistor. The sensor 14 is electrically connected with supporting electronics 18. The sensor 14 via a line 20 is connected with an inductive coil 22. The inductive coil 22 is positioned within a groove provided in the friction separator plate 10 so as not to contact the friction disc which mates with the friction separator plate.

To provide a magnetic field for the inductive coil 22, there is a magnet 24. Accordingly, relative rotation of the friction separator plate 10 with respect to the magnet 24 will cause a current to be induced within the inductive coil 22. The current from the inductive coil 22 via line 20 is utilized to power the sensor 14. Connected with the electronics 18 of the temperature sensor system is an antenna 28. The antenna 28 transmits the temperature data to a controller (not shown).

Figure 2:
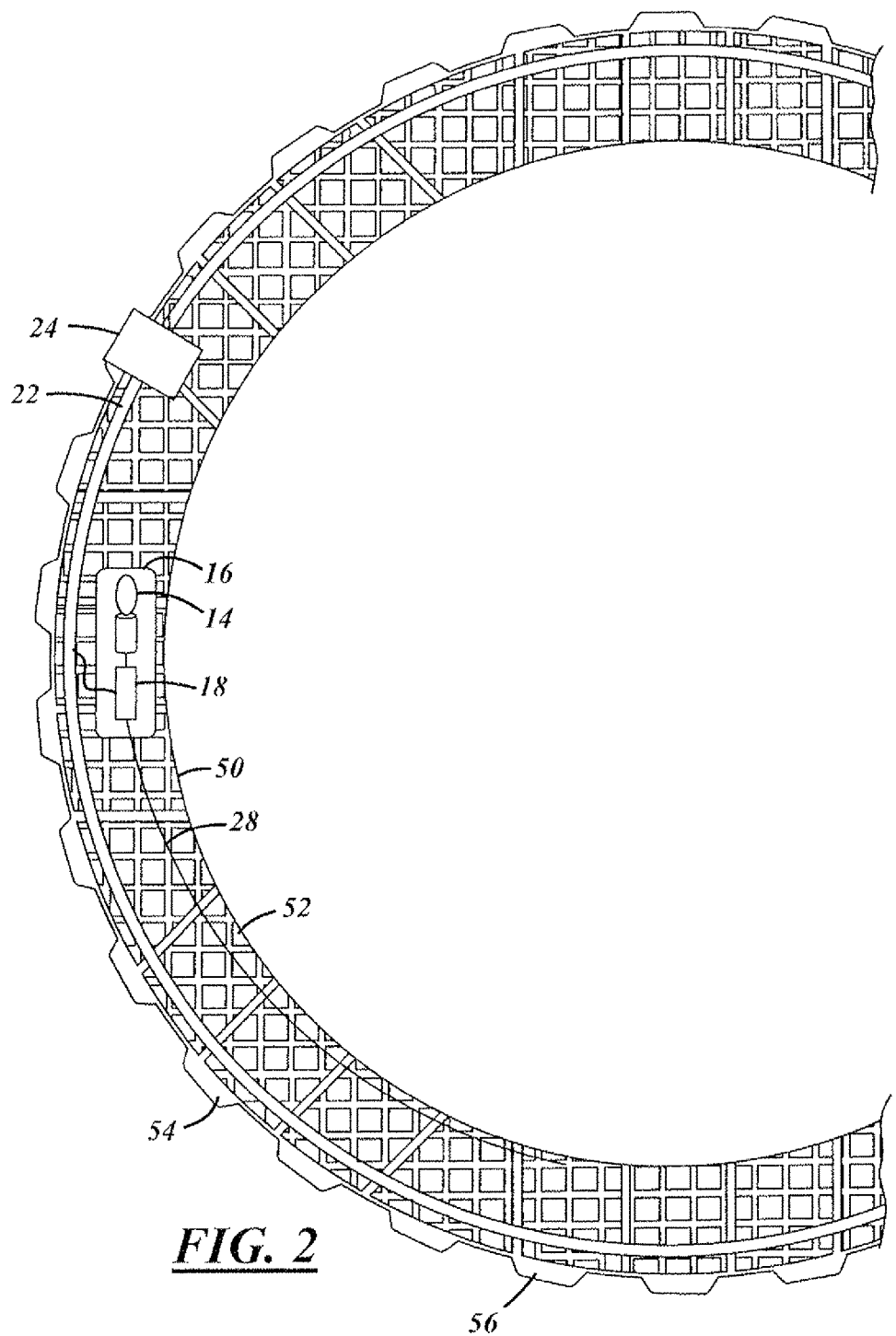
FIG. 2 is a front elevational view of a temperature monitoring system for a clutch apparatus of an alternative embodiment of that shown in FIG. 1 wherein the temperature sensor is embedded within a friction disc.

Referring to FIG. 2, a friction plate 50 is provided. Friction plate 50 has a friction lining 52 which is typically a paper or ceramic material which is bonded or bolt connected to a backing plate 54 typically on both sides. The backing plate along its outer perimeter has a set of gear or splined teeth 56 for connection with a shaft, drum, or housing (not shown) of the clutch mechanism. In the embodiment of the invention shown in FIG. 2, the friction plate has a cutout 16 to allow for insertion of a temperature sensor 14 and accompanying electronics 18 in a manner as similar described for the friction separator plate, the friction plate 50 has antenna 28 and an induction coil 22. The induction coil 22 is empowered by a permanent magnet 24 which is typically affixed to a fixed part of the clutch mechanism.

Figure 3:
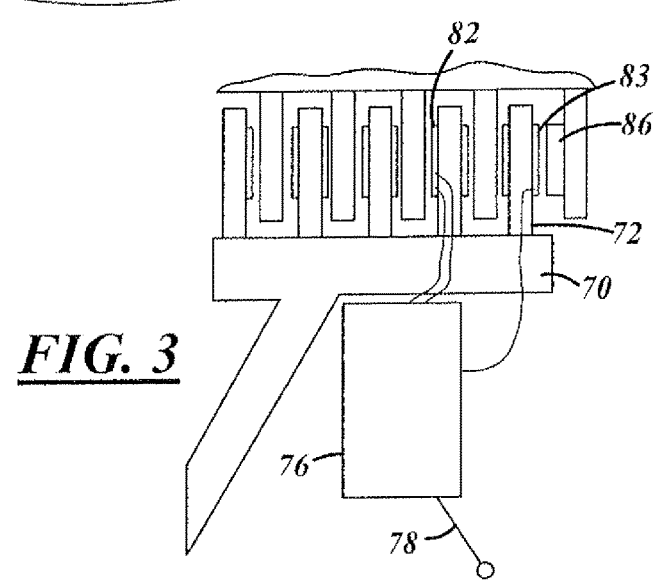
FIG. 3 is a schematic view of a temperature monitoring system for a clutch apparatus according to the present invention wherein the electronics for a temperature sensor are positioned remote from the friction disc.

In FIG. 3, shown schematically, is a clutch housing 70 having a friction pack member 72. Friction pack members 72 are spline connected to the rotating clutch housing 70.

Clutch housing 70 also has the electronics 76 connected thereto with an accompanying antenna 78. The electronics 76 is remotely connected with a sensor embedded within one of the friction linings 82. Another separate friction lining 83 also embeds an inductive coil which is energized by travel within a magnetic field provided by a permanent magnet 86.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A temperature monitoring system for a clutch apparatus, said system comprising:
    a friction disc;
    a friction separator plate for selective engagement with said friction disc;
    a temperature sensor for placement on one of said friction disc and said friction separator plate;
    an inductive coil for placement on said one of said friction disc and said friction separator plate; and
    a magnet for providing a magnetic field for said inductive coil to power said temperature sensor.

2. The temperature monitoring system as described in claim 1 wherein said temperature sensor is embedded in said friction disc.

3. The temperature monitoring system as described in claim 1 wherein said temperature sensor is embedded in said friction separator plate.

4. The temperature monitoring system as described in claim 1 wherein said temperature sensor is electrically connected with an antenna having a position fixed with respect to said temperature sensor.

5. The temperature monitoring system as described in claim 1 wherein said antenna is positioned on one of said friction disc and said friction separator plate said temperature sensor is placed on.

6. The temperature monitoring system as described in claim 1 wherein said temperature sensor is a resistance temperature detector.

7. The temperature monitoring system as described in claim 1 wherein said temperature sensor is a thermistor.

8. A temperature monitoring system for a clutch apparatus, said system comprising:
    a friction disc;
    a friction separator plate for selective engagement with said friction disc;
    a temperature sensor embedded in one of said friction disc and said friction separator plate;
    an inductive coil for placement on said one of said friction disc and said friction separator plate said temperature sensor is embedded in or on the other of said friction disc and said friction separator plate;
    an antenna positioned on said friction disc or said friction separator plate said temperature sensor is embedded in electrically connected with said temperature sensor; and
    a magnet for providing a magnetic field for said inductive coil power said temperature sensor.

9. The temperature monitoring system as described in claim 8 wherein electronic components for processing the electrical signals from said temperature sensor are not positioned on the friction disc or separator plate that the temperature sensor is placed upon.

10. The temperature monitoring system as described in claim 8 wherein there are electronics for processing electrical senses given by the sensor and wherein said electronics are located on the same friction disc or separator plate said temperature sensor is placed on.

11. The temperature monitoring system as described in claim 8 wherein the friction disc or friction separator plate said temperature sensor is on is separate from the friction disc or friction separator plate said inductive coil is on.

12. A method of monitoring temperature for a clutch apparatus comprising:
    providing a friction disc;
    providing a friction separator plate for selective engagement with the friction disc;
    placing a temperature sensor on one of said friction disc and said friction separator plate;
    providing an inductive coil for placement on one of said friction disc and said friction separator plate; and
    providing a magnet for providing a magnetic field for said inductive coil to power said temperature sensor.

* * * * *